A. W. LISSAUER.
HUMIDITY CONTROL.
APPLICATION FILED NOV. 27, 1920.
1,409,221.
Patented Mar. 14, 1922.
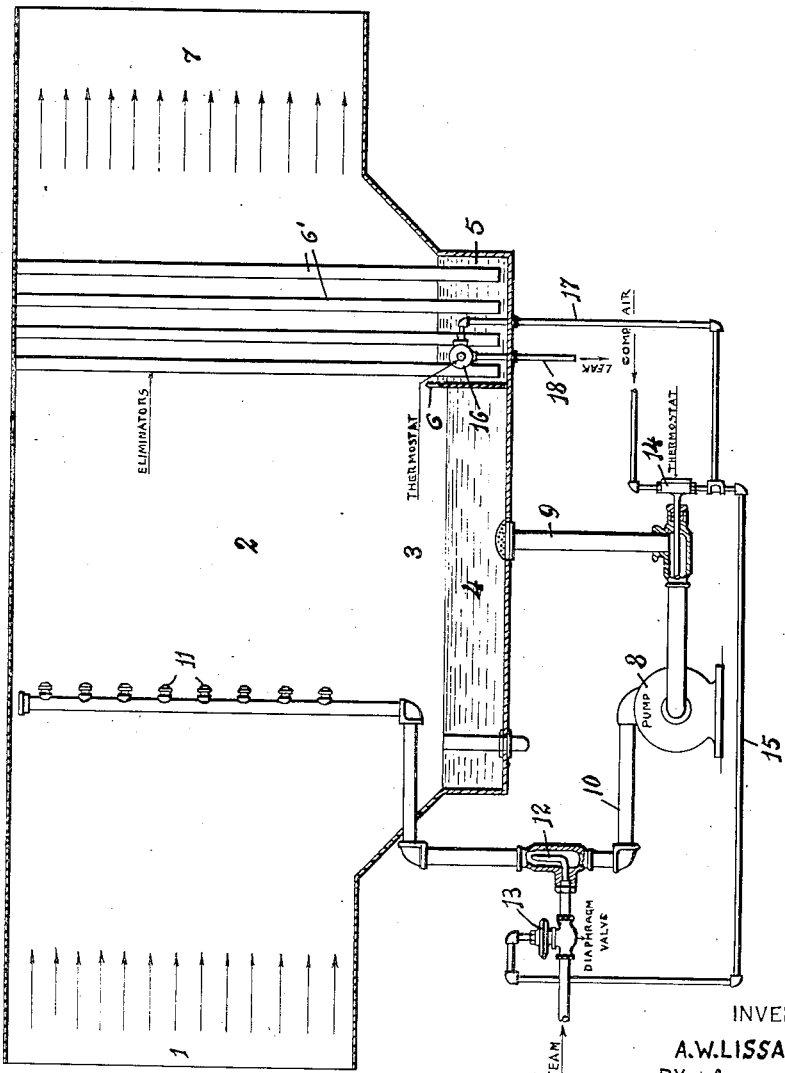
INVENTOR
A.W. LISSAUER.
BY
ATTORNEY

UNITED STATES PATENT OFFICE.

ADOLPH W. LISSAUER, OF NORTH TARRYTOWN, NEW YORK, ASSIGNOR TO W. L. FLEISHER & CO., INC., OF NEW YORK, N. Y., A CORPORATION OF NEW YORK.

HUMIDITY CONTROL.

1,409,221.  Specification of Letters Patent.  Patented Mar. 14, 1922.

Application filed November 27, 1920. Serial No. 426,881.

*To all whom it may concern:*

Be it known that I, ADOLPH W. LISSAUER, a citizen of the United States, a resident of North Tarrytown, Westchester County, and State of New York, have invented a new and Improved Humidity Control, of which the following is a full, clear, and exact description.

An object of the invention is to provide an apparatus for automatically regulating the total heat of air supplied irrespective of atmospheric conditions.

In the accompanying drawing forming part of the application, the figure represents a diagrammatic sectional view through a form of an apparatus embodying my invention.

Referring to the drawing, 1 is an air inlet duct leading into a chamber 2, which is provided with a sump 3, preferably sub-divided into two parts, 4 and 5, by a partition 6, extending transversely within the sump. The portion 5 of the sump is remote from the air inlet duct 1 and receives the lower ends of the eliminators 6' extending from the top of the chamber 2. The portion of the chamber 2 beyond the eliminators 6' forms an air outlet duct 7.

A pump 8 has its suction connected to a conduit 9 leading to the part 4 of the sump. The outlet of the pump is connected to a conduit 10, which leads to a series of nozzles 11 located within the chamber 2, in proximity to the inlet air duct 1 and through which nozzles a spray is formed within the chamber 2 between the inlet air duct and the eliminators 6'.

The air current passing through the chamber 2 carries with it a spray and a greater proportion of the total spray water used is deposited in the eliminators than in any other portion of the spray chamber 2. In consequence, the water from the eliminators assumes a temperature exactly the same as the average wet bulb temperature of the air leaving the eliminators (or total heat).

By providing a partition 6, the portion 5 of the sump forms a receptacle for the water coming from the eliminators, having substantially the same temperature as the average wet bulb temperature of the air leaving the eliminators.

The conduit 10 is provided within with a steam jet 12, the steam supplied to which is controlled by a diaphragm valve 13, the air pressure of said diaphragm valve 13 being controlled from a thermostat 14, which is located so that it is affected by the temperature of the water in the conduit 9 which leads to the intake of the pump 8. In other words, by the temperature of the water coming from the part 4 of the sump. The thermostat 14 is connected to the diaphragm valve 13 by a conduit 15, through which the compressed air flows from the thermostat 14 to the diaphragm valve 13.

If the temperature of the total spray water, which has reacted with the air current, is kept constant, then the wet bulb temperature of the air leaving the eliminators will vary in proportion to the wet bulb temperature of the air entering the spray chamber, but through a range which is exceedingly small in comparison. In order to insure a constant wet bulb temperature of the air leaving the eliminators, it is necessary to counteract the above tendency, by varying the temperature of the reacted water through a range corresponding to the range through which the wet bulb temperature of the air leaving the eliminators would vary if the reacted water temperature were kept constant. The reacted water temperature referred to is the average temperature of all of the spray water after it has raised the wet bulb temperature of the air entering the spray chamber to the wet bulb temperature desired. This necessitates a thermostatically controlled leak on the thermostat in the reacted water, and for this purpose I provide the thermostat 16 which may be maintained in the separators, or as shown in the part 5 of the sump. This thermostat 16 is connected to the conduit 15 by a conduit 17, which has also a leaking conduit 18. The thermostat 16, by causing a leak in the conduit 15 will vary accordingly the effect of the thermostat 14 upon the diaphragm valve 13. Therefore, if the standard wet bulb temperature of the air entering the spray chamber drops, the reacted water temperature being constant, the wet bulb temperature of the air leaving the eliminators will be lower than desired; then the leakage on the reacted water temperature thermostat 16, by the thermostat 14, changes automatically, setting it for a higher reacted water temperature and bringing the wet bulb temperature of the air leaving the eliminators up to the required point. The reverse is true for a rising wet bulb temperature of the air entering the spray chamber.

It may be remarked that the reacted water temperature thermostat 14 takes the place of the wet bulb thermostat normally located in the entering air conduit. The wet bulb thermostat which is located in the entering air conduit, becomes dirty and does not react to the true wet bulb temperature of the air with consequent inaccuracy, while the reacted water temperature thermostat being located at the pump suction can be maintained accurate and really does not require any supervision once the same has been properly set.

I claim—

1. A humidifier comprising in combination a chamber having an air inlet and an air outlet, the said chamber having a two part sump, nozzles in said chamber and above one part of the sump, eliminators in said chamber extending into the other part of the sump, a pump adapted to draw water from the part of the sump below the nozzles and supply water to the nozzles, means for supplying heat to the water supplied by the pump to the nozzles, a diaphragm valve controlling the supply of heat, a thermostat for controlling the diaphragm valve, affected by the water drawn by the pump from the sump, and a second thermostat located in the part of the sump below the eliminators, said second mentioned thermostat being adapted to vary the effect of the first mentioned thermostat upon the diaphragm valve.

2. A humidifier comprising in combination a chamber having an air inlet and an air outlet, said chamber having a two part sump, nozzles in said chamber above one part of the sump, eliminators in said chamber extending into the other part of the sump, a pump adapted to draw water from the part of the sump below the nozzles and supply said water to the nozzles, means for supplying heat to the water supplied by the pump to the nozzles, a diaphragm valve for controlling the supply of heat, a conduit for supplying compressed air to said diaphragm valve, a thermostat affected by the temperature of the water drawn by the pump from the sump, and having means engaging the conduit for compressed air, for controlling the flow of compressed air to the diaphragm valve, and a second thermostat located in the part of the sump below the eliminators, and a conduit from said second thermostat to the conduit for compressed air, connecting the first thermostat to the diaphragm valve, said second thermostat being adapted to cause a leak in said conduit and thereby vary the effect of the first thermostat upon the diaphragm valve.

ADOLPH W. LISSAUER.